United States Patent [19]

Takeda et al.

[11] 4,144,424
[45] Mar. 13, 1979

[54] SWITCH FOR VEHICLE TRANSMISSION WITH AUTOMATIC CLUTCH

[75] Inventors: Noriyuki Takeda, Yokohama; Tamio Kawamoto, Sagamihara, both of Japan

[73] Assignee: Nissan Motor Company, Limited, Japan

[21] Appl. No.: 783,750

[22] Filed: Apr. 1, 1977

[30] Foreign Application Priority Data

Apr. 5, 1976 [JP] Japan .............................. 51-40870[U]

[51] Int. Cl.² ........................ H01H 9/06; B60K 21/00
[52] U.S. Cl. ............................... 200/61.88; 180/77 R; 192/3.58; 192/3.59; 200/6 A; 200/61.54; 200/61.85; 200/153 K
[58] Field of Search ..................... 180/77 R; 192/3.56, 192/3.58; 200/61.88, 6 A, 61.54, 61.85

[56] References Cited

U.S. PATENT DOCUMENTS

| 2,732,447 | 1/1956 | Findley | 180/77 R |
| 3,223,792 | 12/1965 | Strother, Jr. | 200/6 A |
| 3,268,680 | 8/1966 | Anderson | 180/77 R |
| 3,322,248 | 5/1967 | Kaptor et al. | 192/3.58 |
| 3,360,620 | 12/1967 | Ward | 200/6 A |
| 3,631,946 | 1/1972 | Grosseau | 192/3.58 |
| 3,910,388 | 10/1975 | Moori et al. | 192/3.56 |

Primary Examiner—Joseph F. Peters, Jr.
Assistant Examiner—Donn McGiehan
Attorney, Agent, or Firm—Robert E. Burns; Emmanuel J. Lobato; Bruce L. Adams

[57] ABSTRACT

A switch is incorporated in a shift knob mounted to a gear shift lever for limited movement and includes a stationary contact and three mutually insulated contact fingers cooperable with the stationary contact. The contact arrangement is such that manipulation of the shift knob upon selecting one of a first group of positions of the shift lever will cause one of first and second contact fingers to contact with the stationary contact and manipulation of the shift knob upon selecting one of a second group of the positions of the shift lever will cause third contact finger to contact with the stationary contact and thereafter will cause one of first and second contact fingers to contact with the stationary contact.

2 Claims, 6 Drawing Figures

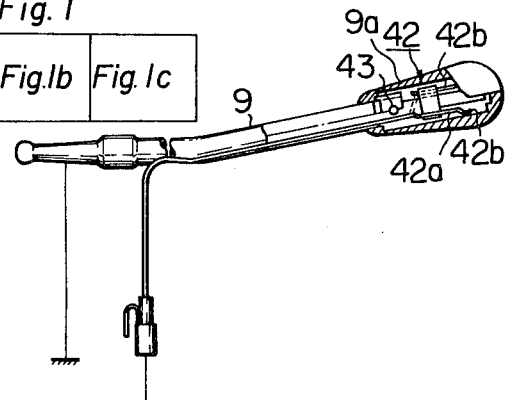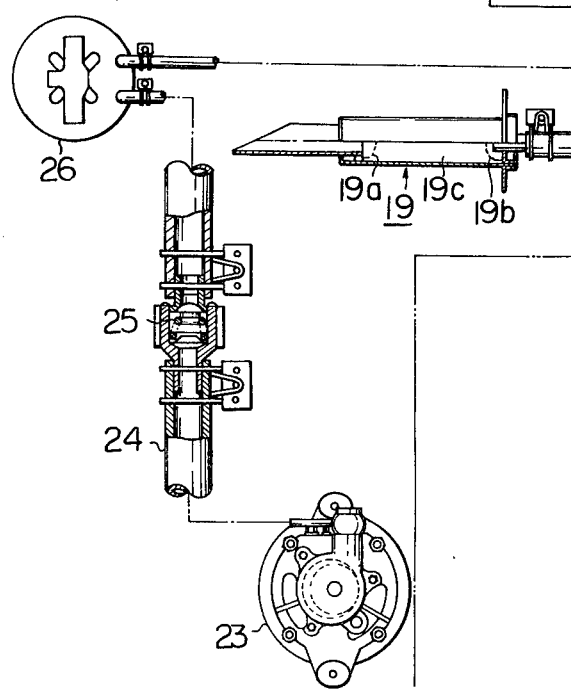

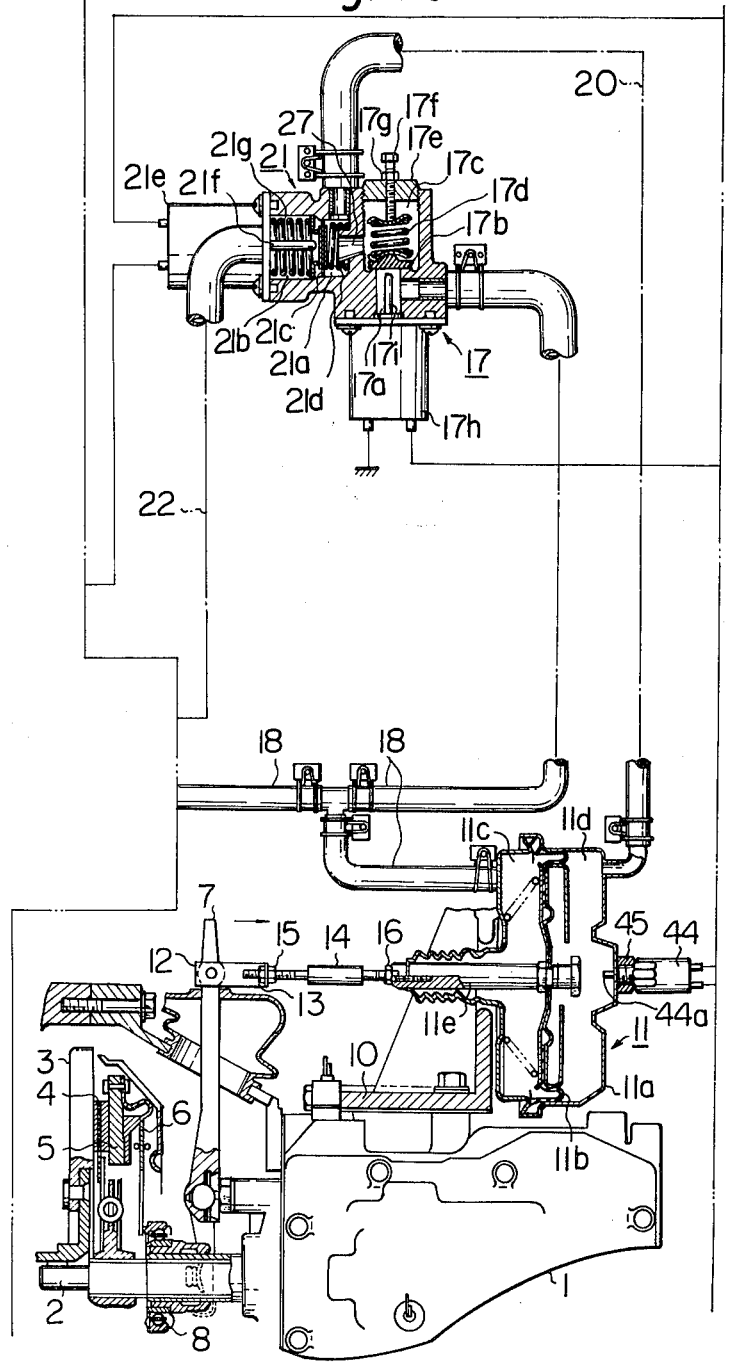

SWITCH FOR VEHICLE TRANSMISSION WITH AUTOMATIC CLUTCH

BACKGROUND OF THE INVENTION

The present invention relates to a gear shift lever incorporating a switch for operating a clutch of a vehicle transmission.

A vehicle transmission with an automatic clutch is known in which for gear shifting the clutch is disengaged with the assistance of a vacuum of a source of vacuum, via a control valve having a solenoid actuated clutch release valve and a clutch servo. When a knob of a gear shift lever is manipulated to urge the gear shift lever to any one the shift positions, a switch associated with the gear shift lever is closed to energize the solenoid for the clutch release valve. The clutch release valve then connects the clutch servo to the source of vacuum to disengage the clutch so as to disconnect a gear box from the engine drive.

The gear box in the known vehicle transmission can be swiftly shifted into any one of the forward gears with the help of synchronizing means, but is not provided with any synchronizing means for enabling a swift shift to the reverse. Therefore, it is necessary when engaging the gears for the reverse to disengage the clutch earlier than usual. If this is not done, the gears for reverse are likely to grind with each other and in excessive cases the teeth of the gears will be damaged.

SUMMARY OF THE INVENTION

It is therefore an object of the present invention to provide a switch in which its contacts are closed earlier when a gear shift lever is moved toward reverse than the case when the gear shift lever is moved toward any one of the forward positions, so that a clutch will be disengaged well before the gear shift lever takes the reverse to assure the engagement of the gears for the reverse without grinding nor damaging of the gears.

It is another object of the present invention to provide a switch of the above type which can be incorporated in any conventional gear shift lever with less modification of component parts of the gear shift lever.

BRIEF DESCRIPTION OF THE DRAWINGS

The invention will be further described in connection with the FIG. 1 is a diagram illustrating how FIGS. 1a, 1b and 1c are related accompanying drawings, in which:

FIGS. 1a, 1b and 1c are views, partly in section, of a vehicle transmission;

DETAILED DESCRIPTION OF THE INVENTION

Figure 1C:
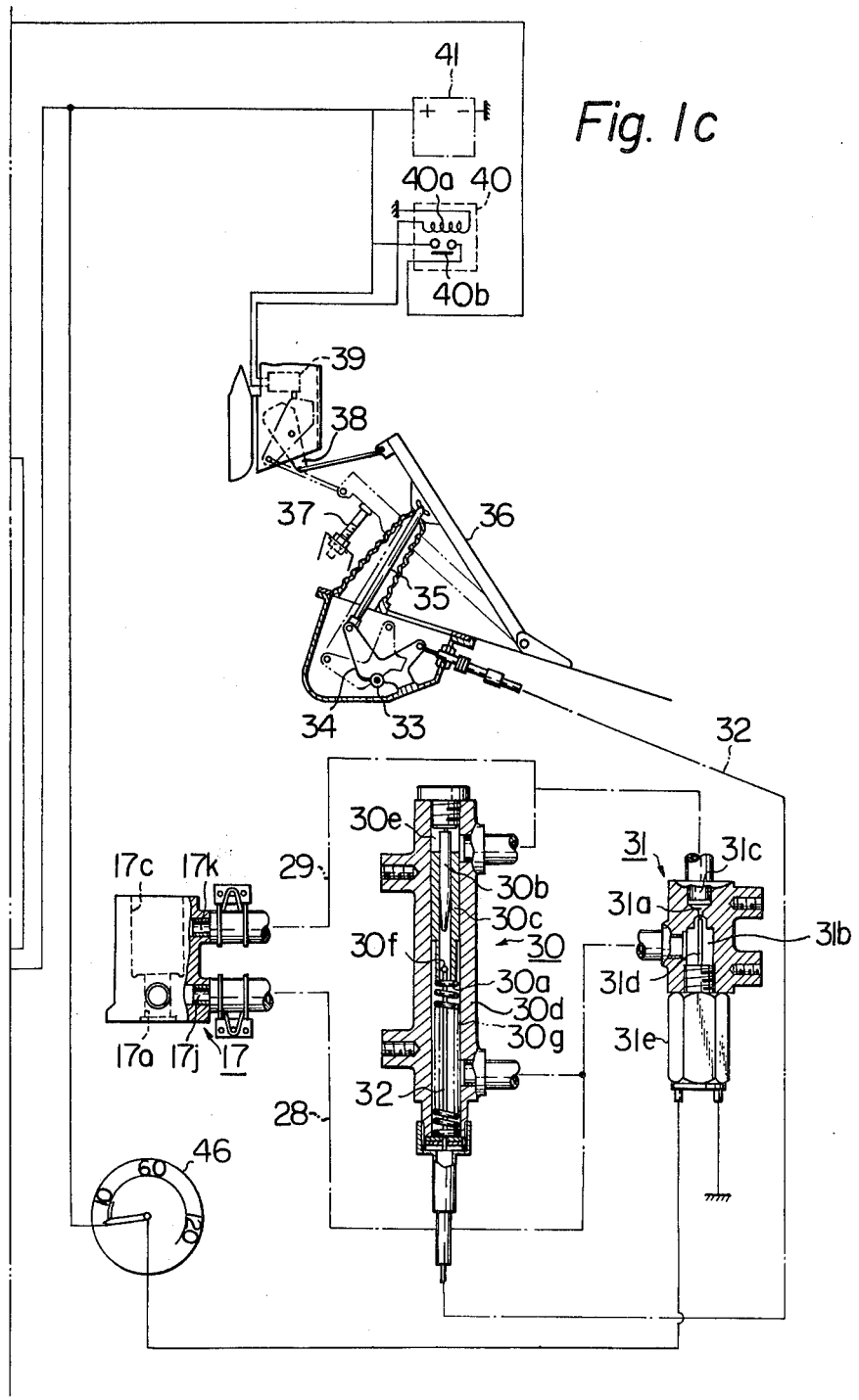

A vehicle transmission shown in FIG. 1 generally comprises a clutch, a control valve and an electrical control arrangement.

Clutch

The clutch is provided in a power line of the vehicle transmission to connect an input shaft 2 of a gear box 1 to or disconnect the input shaft 2 from an engine crankshaft, not shown, and comprises a clutch disc having friction pads on both sides thereof and secured to a clutch hub splined to the input shaft 2. The clutch disc 4 is axially movable and disposed between a back up plate, in the form of a flywheel 3, driven by the engine crankshaft and a pressure plate 5. The pressure plate 5 is actuated by a single diaphragm spring of disc form 6. When the clutch is engaged, the diaphragm spring 6, of conical form, is flattened to provide the clamping pressure on the clutch disc 4. When disengaging the clutch, a withdrawl lever 7, which is pivoted on a ball secured to the housing of the gear box 1, operates through a release bearing 8 direct on the central portion of the diaphragm spring 6. Near the outer portion of the diaphragm spring 6 a fulcrum is provided so that pressure on the diaphragm spring 6 at the center, toward the flywheel 3, forces the pressure plate 5 away from the flywheel 3 and thus frees the friction plate 4 from the engine drive. The illustrated positions of the parts of the clutch show the clutch in its engaged condition so that rotating the withdrawal lever 7 clockwise as viewed will disengage the clutch. When the clutch is disengaged, gears can be shifted by a gear shift lever 9 in the normal manner. The clutch is actuated by a clutch servo (clutch actuator) 11 via the withdrawal lever 7.

Clutch Servo

The clutch actuator 11 is mounted on a bracket 10 which is secured to the gear box 1. The clutch actuator 11 comprises a shell 11a and a diaphragm 11b mounted in the shell 11a with its outer peripheral portion securely clamped between two bell shaped housings, which form the shell 11a, to divide the interior of the shell 11a into two chambers 11c and 11d. Mounted securely to the central portion of the diaphragm is an actuator rod 11c. The actuator rod 11e projects outwardly of the shell 11a, via the chamber 11c, and is operatively linked with the withdrawal lever 7 through an adjusting rod 14.

The adjusting rod 14 is formed with a left hand screw at one end and a right hand screw at an opposite end, and has its one end threadedly received in a tapped hole formed in a clevis 12, which rotatably supports a free end of the withdrawal lever 7 and has its opposite end threadedly received in a tapped hole formed in a projecting end of the actuator rod 11e. Denoted by 15 is a lock nut formed integral with the clevis 12 and denoted by 16 is another lock nut. Adjustment is effected by rotating the adjusting rod 14.

The chamber 11c of the clutch actuator 11 communicates at all times with the atmosphere, while the chamber 11d is connected to or disconnected from a source of vacuum under the control a control valve.

A compression spring is disposed in the chamber 11c of the clutch actuator 11 to balance with the diaphragm spring 6 of the clutch to assist the actuator rod 11e in moving toward the chamber 11d upon building up of a vacuum in the chamber 11d.

Silencer

The chamber 11c of the clutch actuator 11 is connected to the atmosphere through conduit means 18 via a silencer 19.

The silencer 19 comprises a tubular casing having its both ends closed with meshes 19a and 19b. A filter element 19c, such as an element of an urethane, fills the interior of the tubular casing between the meshes 19a and 19b so as to eliminate noise due to air entering into the conduit means 18 and so as to clean the air. The silencer 19 has its inlet port 19d projecting from the tubular casing inclined to prevent a whistling noise.

The control valve comprises a solenoid actuated clutch release valve 21 and a solenoid actuated air-on valve 17.

Clutch Release Valve

The clutch release valve 21 has an output chamber 21a from which a conduit 20 leads to the chamber 11d of the clutch actuator 11 and an input chamber 21d to which a conduit 22 leads from a vacuum tank 26. A vacuum pump 23, driven by the engine, is connected to the vacuum tank 26 by a conduit 24 via a check valve 25. Alternatively, the engine manifold vacuum may be used, as a source of vacuum, by connecting the input chamber 21b to the engine manifold (not shown) via a check valve. Preferably, a vacuum tank is provided between the check valve and the input chamber 21b.

The clutch release valve 21 comprises a valve member 21c cooperable with a valve seat positioned between the input and output chambers 21b and 21a, a valve spring 21d disposed in the output chamber 21a to bias the valve member toward the valve seat, and a distance spring 21g disposed in the input chamber 21b to hold the valve seat. The output chamber 21a communicates with a chamber 17c of the air-on valve 17 by a connecting passage 27.

A solenoid 21e is installed with its actuating plunger 21f disposed in the input chamber 21b and directed toward the valve member 21c. When the solenoid 21e is not energized, the plunger 21f is in the illustrated position to cause the valve member 21c to seat on the valve seat to close communication between the input and output chambers 21b and 21a. In this position of the valve member 21c, the chamber 11d is disconnected from the vacuum tank 26, but is connected to the chamber 17c of the air-on valve 17 via the connecting passage 27. When the solenoid 21e is energized, the plunger 21f moves to the right, as viewed, toward the valve member 21c to urge the valve member 21c, against the bias action of the valve spring 21d, away from the valve seat toward the connecting passage 27 to close the same. In this position of the valve member 21c, the chamber 11d of the clutch actuator 11 is connected to the vacuum tank 26, but is disconnected from the chamber 17c of the air-on valve 17.

Air-on Valve:

The air-on valve 17 comprises an atmosphere chamber 17a which is open to the atmosphere via the conduit means 18. The chambers 17a and 17c are connectable under the control a valve member 17b. The valve member 17b is biased toward a closed position to close communication between the chambers 17a and 17c by a valve spring 17d.

One end of the valve spring 17d acts on the valve member 17b and an opposite end thereof seats on a valve retainer held by a screw 17f threadedly engaging a screw cap 17e which closes the chamber 17c. A lock nut 17g threadedly engages the screw 17f. Turning the screw 17f will reduce or increase biasing force on the valve member 17b.

A solenoid 17h is installed with its actuating plunger 17i disposed in the chamber 17a and directed toward the valve member 17b. When the solenoid 17h is not energized, the plunger 17i is in the illustrated position to cause the valve member 17b to close communication between the chambers 17a and 17c. When the solenoid 17h is energized, the plunger 17i moves upwardly, as viewed, to urge the valve member 17b, against the action of the valve spring 17d toward an upon position to open free communication between the chambers 17a and 17c. In the open position of the valve member 17b, the chamber 17c communicates with the atmosphere without any flow restriction.

Accelerator Actuated Valve

The accelerator actuated valve 30 controls a bleed air flowing from the chamber 17a to the chamber 17c bypassing the valve member 17b of the air-on valve 17 and is connected to a port 17j, opening to the chamber 17a, by conduit means 28 and to a port 17k, opening to the chamber 17c, by conduit means 29.

The accelerator actuated valve 30 comprises a housing 30a having a bore therethrough. One end of the bore is closed by an end plug screwed into the bore. From the end plug a needle 30b extends into the bore. The needle 30b has its pointed free end portion positioned in a hollow of a sleeve 30c slidably received in the bore of the housing 30a. A valve spring 30g is mounted in the bore between an end plug closing the opposite end of the bore and the sleeve 30c to bias the sleeve 30c upwardly, as viewed, to a close position, as illustrated, in which the hollow of the sleeve 30c is closed by the needle 30b thus dividing the bore into two chambers 30e and 30d. The chamber 30d communicates with the atmosphere via the conduit means 28, the port 17j, the chamber 17, the conduit means 18 and the silencer 19. The chamber 30e communicates with the chamber 17c via the conduit means 29 and the port 17k.

The increase of the opening of the hollow, and corresponding increase of effective flow sectional area between the chambers 30d and 30e, can be controlled by an engine accelerator 36.

A wire cable 32 has its one end attached to the sleeve 30c by a pin 30g and its other end linked to one arm of a bell crank lever 34 rotatably mounted to a pivot shaft 33. The bell crank lever 34 has its other arm linked to a push rod 35 of the accelerator 36. When the accelerator 36 is released, as illustrated by the solid line, the sleeve 30c is in the illustrated position to close communication between the chambers 30d and 30e. When the accelerator 36 is depressed, the sleeve 30c is moved downwardly, as viewed, against the bias action of the valve spring 30g to open communication between the chambers 30d and 30e.

The accelerator actuated valve 30 is so designed that the effective flow sectional area between the chambers 30d and 30e increases as the depression of the accelerator 36 increases.

Vehicle Speed Responsive Valve:

The vehicle speed responsive valve 31 is connected to the port 17j by the conduit means 28 and to the port 17k by the conduit means 29 bypassing the accelerator actuted valve 30.

The vehicle speed responsive valve 31 has a flow restricting orfice 31a providing restricted flow communication between a chamber 31b, which communicates with the atmosphere via the conduit means 28, the port 17j, the chamber 17a, the conduit means 18 and the silencer 19, and a chamber 31c, which communicates with the chamber 17c via the conduit means 29 and the port 17k.

A solenoid 31e is installed with its actuating plunger 31d disposed in the chamber 31b. The plunger 31d has its free end portion formed with a valve adapted to close the orifice 31a. When the solenoid 31e is energized, the plunger 31d is in the illustrated position to close the orifice 31a thereby blocking fluid communication between the chambers 31b and 31c. When the solenoid is not energized, the plunger 31d moves downwardly, as viewed, to open the orifice 31a, thereby providing restricted flow communication between the chambers 31b and 31c.

Electrical Control Arrangement

The solenoid 21e for the clutch release valve 21 is electrically connected in series with a normally open switch 40b of a relay 40, a shift switch 42 and a battery 41. The relay 40 has a relay coil 40a which, when energized, causes the normally open switch to be closed.

The relay coil 40a is electrically connected in series with a micro-switch 39, which in cooperation with a cam member 38 constitutes an acceleration switch.

Acceleration Switch

The micro switch 39 is actuated by the cam member 38 operatively linked with the accelerator 36 so that when the accelerator is released (the illustrated position by the solid line), the cam member closes the micro switch, but when the accelerator is depressed, the cam member opens the micro switch.

The cam member 38 is therefore designed such that as long as the accelerator is between the fully depressed position (the illustrated position by the imaginary line and defined by a stopper 37) and a position (not shown) slightly depressed from the released position (the illustrated position by the solid line) of the accelerator 36, the cam member 38 keeps the micro switch opened, but when the accelerator 36 is between the position slightly depressed from the released position and the released position, the cam member 38 closes the micro switch 39.

Shift Switch

The shift switch 42 is incorporated in a shift knob 9a mounted on the gear shift lever 9 and, comprises a stationary contact 42a carried by the gear shift lever and a pair of movable contact fingers 42b (see FIG. 1). The shift switch 42 also comprises a third movable contact finger 42c (see FIGS. 2 and 3). The stationary contact 42a is grounded, while the three movable contact fingers 42b and 42c are electrically interconnected and electrically connected to one terminal of the solenoid 21e for the clutch release valve 21. The shift knob 9a serves as an actuator for moving the three movable contact fingers 42b and 42c into contact with the stationary contact 42a to close the shift switch 42. The shift switch 42 will be described in greater detail hereinafter with reference to FIGS. 2 through 4.

Actuator Switch

The solenoid 17h for the air-on valve 17 is electrically connected in series with the actuator switch 44, the ignition switch (IG), the fuse (F) and the battery 41.

The actuator switch 44 is mounted securely on the clutch actuator 11 through threaded engagement with a nut 45 fixedly secured to the shell 11a. The actuator switch 44 has its actuating plunger 44a projecting into the chamber 11d and axially aligned with the actuator rod 11e. The actuator switch 44 is constructed such that pressing the actuating plunger 44a to the right, as viewed, will close the switch 44.

The amount of protrusion of the actuating plunger 44a is selected such that when the actuator rod 11e moves to the right, as viewed, and approaches the dead position of its stroke upon disengaging the clutch, the head of the actuator rod 11e will begin to press the actuating plunger 44a to close the switch 44. Preferably, the amount of protrusion of the actuating plunger 44a is selected such that it is kept pressed to close the switch 44 until the clutch begins to or is about to engage after the reengagement of the clutch has commenced.

Vehicle Speed Responsive Switch

The solenoid 31e for the speed responsive valve 31 is connected in series with the vehicle speed responsive switch 46. The vehicle speed responsive switch 46 is constructed and arranged such that when the vehicle speed, which may be represented by revolution per unit time of the gear box output shaft, is lower than a predetermined value, such as 10km/h, the switch 46 is closed to supply current to the solenoid 31e, while when the vehicle speed is higher than the predetermined value, it is closed to cut the flow of current to the solenoid 31e.

The vehicle transmission will operates as follows:

Disengagement of the Clutch:

When the shift knob 9a is manipulated to close the shift switch 42 and the accelerator 36 is released to close the micro-switch 39, current is supplied to the relay coil 40a of the relay 40 to close the switch 40b. Closing of the switch 40b will permit current to the solenoid 21e for the clutch release valve 21. Disengagement of the clutch commences as soon as the switch 40b of the relay 40 has been closed to energize the solenoid 21e. The solenoid 21e then urges the clutch release valve member 21c, against the action of the valve spring 21d, away from the valve seat toward a position to close the connecting passage 27, and thus the clutch release valve 21 connects the chamber 11d of the clutch actuator 11 to the vacuum tank 26. The chamber 11d is connected to the vacuum tank 26, via the conduit means 20, the output chamber 21a, the input chamber 21b and the conduit means 22. Vacuum develops rapidly in the chamber 11d and thus atmospheric pressure in the chamber 11c forces the diaphragm 11b and the actuator rod 11e to the right, as viewed. This rightward movement of the actuator rod 11e, via the adjusting rod 14, the withdrawal lever 7 and the clutch release bearing 8, disengages the clutch. The gears can be shifted in the normal manner.

Since the micro-switch 39 is connected in series with the shift switch 42, the clutch will not be disengaged even if the shift knob 9a is manipulated to close the shift switch 42 when the vehicle is travelling because the micro-switch 39 is opened as long as the accelerator 36 is kept depressed. Therefore, unnecessary engine free running when the vehicle is travelling can be avoided.

Reengagement of the Clutch:

The reengagement of the clutch commences as soon as the shift knob 9a is released to open the shift switch 42 and/or the accelerator 36 is released to open the micro-switch 39. This cuts the flow of current to the relay coil 40a to open the switch 40b. Opening of the switch 40b will cut the flow of current to the solenoid 21e. The solenoid 21e then allows the clutch release valve member 21c to seat on the valve seat (the illustrated position in FIG. 1) to disconnect the chamber 11d of the clutch actuator 11 from the vacuum tank 26 and to open the connecting passage 27.

This rapid leftward movement of the actuator rod 11e terminates as soon as the actuator switch 44 is opened to cut the flow of current supplied to the solenoid 17h.

Second Stage Vacuum Reduction

The first stage vacuum reduction terminates as soon as the flow of current supplied to the solenoid 17h is cut and thus the solenoid 17h allows the air-on valve member 17b to close unrestricted flow communication between the chambers 17a and 17c.

In the second stage the residual vacuum in the chamber 11d of the clutch actuator is dissipated gradually by means of the accelerator actuated valve 30 and the vehicle speed responsive valve 31. There are three possible take-up characteristics of the second stage depending on operating conditions of the vehicle, which are:

The second stage when the vehicle is in motion immediately follows the first stage because when the vehicle is in motion the vehicle speed responsive switch 46 is closed to cause the switch 47a to open to cut the flow of current supplied to the solenoid 31e and thus the solenoid 31e opens the flow restricting orifice 31a.

If, under this operating condition of the vehicle, the accelerator 36 remains released after the gear shift has been completed, the residual vacuum in the chamber 11d of the clutch actuator 11 is dissipated gradually via the orifice 31e The reduction of the vacuum in the chamber 11d of the clutch actuator 11 takes place in two stages as soon as the flow of current to the solenoid 21e is cut upon opening of the switch 40b of the relay 40.

First Stage Vacuum Reduction:

In the first stage, the vacuum in the chamber 11d of the clutch actuator 11 is reduced very quickly by means of the air-on valve 17 until the clutch begins to engage or is about to engage because the clutch actuator 11e keeps the actuating plunger 44a depressed to close the actuator switch 44 during this period. Closing of the switch 44 will permit current to be supplied to the solenoid 17h for the air-on valve 17. The solenoid 17h then urges the air-on valve member 17b, against the action of the valve spring 17d, upwardly, as viewed to provide unrestricted flow communication between the chambers 17a and 17c.

In this stage, therefore, an atmosphere air is bled to the chamber 11d of the clutch actuator, via the silencer 19, the conduit means 18, the chamber 17a, the chamber 17c, the connecting passage 27, the output chamber 21a and the conduit means 20, without any flow restriction and thus the clutch spring 6 forces the release bearing 8 to the right, as viewed. This rightward movement of the release bearing 8, via the withdrawal lever 7 and the adjusting rod 14, moves the actuator rod 11e and the diaphragm 11b leftwardly (as viewed) rapidly until the clutch begins to engage or is about to engage. only so that, after a predetermined time, the clutch is fully engaged. Therefore, the clutch can be smoothly engaged when engine brake is to be effected.

The reduction of the vacuum in the second stage when the vehicle is motion can be speeded up in response to depression degree of the accelerator 36 because as the accelerator 36 is depressed the sleeve 30c is moved away from the needle 30b to increase effective flow sectional area between the chambers 30d and 30e. Therefore, smooth and swift gear shift operation without any excessive slip of the clutch is effected.

When the vehicle is at a standstill, the second stage will not commence, if the shift knob 9a is released, as long as the accelerator 36 is released because when the vehicle in at a standstill the flow restricting orifice 31a is closed and the accelerator actuating valve 30 is closed too. Hence accidental moving off of the vehicle from the present stationary position is prevented.

Figure 2:
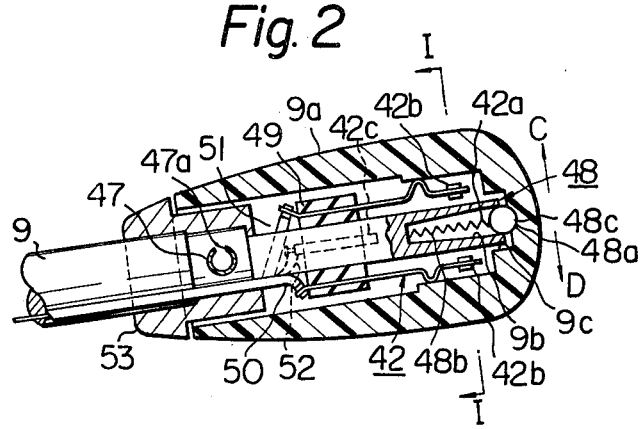
FIG. 2 is a fragmentary view of a gear shift lever with a knob, showing a switch incorporated in the knob.
Figure 3:
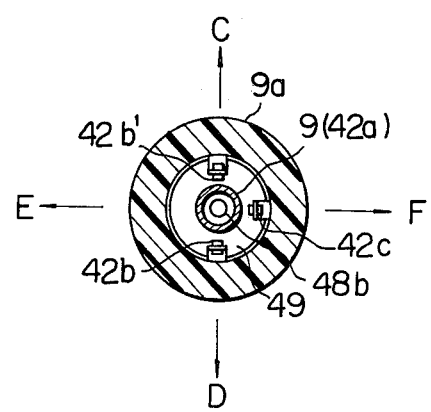
FIG. 3 is a sectional view taken through section line I—I shown in FIG. 2.
Figure 4:
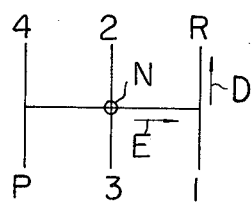
FIG. 4 is a schematic view showing a shift pattern of the gear shift lever.

Reference is now made to FIGS. 2 through 4 to precisely explain the switch 42 incoporated in the shift knob 9a of the gear shift lever 9.

The gear shift lever 9 has four forward shift positions (shown by notations "1," "2," "3," and "4"), a reverse shift position (shown by notation "R") and a parking position (shown by notation "P"). The gear shift lever also has a neutral position (shown by notation "N") and a spring, not shown, is provided to oppose movement of the gear shift lever 9 in a direction E (see FIG. 4) from the "N" position to hold the gear shift lever 9 to the "N" position, as in the conventional manner.

As shown in FIG. 2, the shift knob 9a is movably mounted to the gear shift lever 9 with a tubular springy pin 47 with a longitudinal slit 47a. The pin 47 extends transversely through the gear shift lever 9 and has its both ends fixed to the shift knob 9a. The pin 47 is rotatably mounted to the gear shift lever 9 and lies normal to opposite directions C and D (see FIGS. 3 and 4 also) so that the shift knob 9a is movable, about the axis of the pin 47, in the directions C and D. The provision of the longitudinal slit 47a will permit the shift knob 9a to move in two opposite directions E and F which are normal to the directions C and D. The slit 47a will be narrowed to allow such movements of the shift knob 9a in the directions E and F.

The shift knob 9a has a blind bore into which the stationary contact 42a extends from the gear shift lever 9. An end plug 53 to close the open end of the blind bore of the shift knob 9a is attached to the gear shift lever 9. The end plug 53 is positioned spaced from the open end of the shift knob 9a so as to permit movement of the shift knob 9a relative to the gear shift lever 9. The shift knob 9a is held to the centered position, relative to the gear shift lever 9, with a check mechanism 48.

The blind bore of the shift knob 9a comprises a reduced diameter bore section 9c into which the stationary contact 42a extends. The stationary contact 42a has a blind bore 9b and rotatably carries a detent ball 48c at the open end of the blind bore 9b. A spring 48b is mounted within the blind bore 9b to bias the ball 48c into a detent recess 48a formed at the center of the bottom wall of the reduced diameter bore section 9c to serve as the check mechanism 48 for holding the shift knob 9a to the centered position. Movements in the directions C, D, E and F of the shift knob 9a from the centered position are limited by abutting engagement of the reduced diameter bore section 9c with the stationary contact 42a.

A ring-like insulator member 49 is fixedly coupled with the stationary contact 42a. The pair of contact fingers 42b, 42b' the third contact finger 42c each have a respective end held fixed relative to the stationary contact 42a through the ring-like insulator 49, as shown in FIG. 2 so that the contact fingers 42b, 42b' and 42c are electrically diconnected from the stationary contact 42a. The three contact fingers 42b, 42b' and 42c are electrically interconnected because three lead lines 50, 51 and 52 leading respectively from the three contact fingers are connected to the same terminal of the solenoid 21e (see FIG. 1), while the stationary contact 42a is grounded through the gear shift lever 9.

The three contact fingers 42b, 42b' and 42c are arranged in a ring about the stationary contact 42a and have their free ends spaced substantially 90° apart around the stationary contact 42a. The free ends of the pair of contact fingers 42b, 42b' are spaced in the opposite directions C and D from the stationary contact 42a so that when the shift knob 9a is urged in the direction C with a load greater than a predetermined value (such as 2kg), the shift knob 9a will move one contact finger 42b of the pair into contact with the stationary contact 42a, while, when the shift knob 9a is urged in the direction D with a load greater than the predetermined value, the shift knob 9a will move the other contact finger 42b' of the pair into contact with the stationary contact 42. The free end of the contact finger 42c is spaced in the direction F (see FIG. 3) from the stationary contact 42a so that when the shift knob 9a is urged in the direction E with a load greater than the predetermined value of 2kg, the shift knob 9a will move the contact finger 42c into contact with the stationary contact 42a.

When, in operation, the driver urges the shift knob 9a in the direction D to move the gear shift lever 9 from the "N" position toward the "2" position, one contact finger 42b' of the pair contacts with the stationary contact to cause the clutch to commence to disengage. When the driver urges the shift knob 9a in the direction C to move the gear shift lever 9 from the "N" position toward the "3" position, the other contact finger 42b of the pair contacts with the stationary contact 42a to cause the clutch to commence to disengage. When making a shift from the "N" position to the "4" position, the shift knob 9a is urged in the direction F to move the gear shift lever 9 in the direction F and then in the direction D to move the gear shift lever toward the "4" position. In this operation, none of the contact fingers 42b, 42b' and 42c will contact with the stationary contact when the shift konb 9a is urged in the direction F and when the shift knob 9a is urged in the direction D, one contact finger 42b' of the pair will contact with the stationary contact 42a to cause the clutch to disengage. When making a shift from the "N" position to "R" position, the shift knob 9a is urged in the direction E to move the gear shift lever 9 in the direction E, against the bias action of the spring opposing such movement, so that the shift knob 9a moves the contact finger 42c into contact with the stationary contact 42a to cause the clutch to commence to disengage and, then the shift knob 9a is urged in the direction D to move the gear shift lever 9 toward the "R" position to move one contact finger 42b' of the pair into contact with the stationary contact 42a to keep the clutch disengaged.

It will now be understood that disengagement of the clutch upon gear shifting to the reverse position commences earlier than upon gear shifting to the "2," "3," or "4" positions. Hence, the driver can make a shift to the reverse position swiftly without any fear that the gears might grind with each other to damage the gears.

What is claimed is:

1. An electric switch comprising:

a gear shift lever having a tubular pin rotatably and radially extending therethrough and a stem portion projecting axially beyond said tubular pin;

a knob fixedly mounted to said tubular pin and having an axial bore into which said stem portion extends substantially coaxially thereof, said knob being tiltable relative to said stem portion in first and second opposite directions about an axis of said tubular pin;

said tubular pin having slit-defining means for permitting said knob to yieldably tilt in third and fourth opposite rockable directions within an axial plane including therein said axis of said tubular pin;

a stationary contact carried by said stem portion;

three elongate contact fingers which have their respective one ends fixedly attached to said stem portion and which have their respective opposite ends arranged around said stationary contact and carrying three movable contacts, respectively, cooperating with said stationary contact, said three elongate contact fingers having respective intermediate portions engageable with surfaces defining said axial bore so that said three movable contacts are selectively engageable with said stationary contact in response to the relative tilting movement of said knob in said first, second and third directions only; and means for urging said knob toward a position corresponding with an open condition of said stationary contact and said three movable contacts.

2. An electric switch as claimed in claim 1, in which manipulating said knob to urge said gear shift lever from a neutral position corresponding with a neutral condition of a gear box toward a reverse position corresponding with a reverse condition of the gear box will urge a first one of said three movable contacts into engagement with said stationary contact and thereafter urge a second one of said three movable contacts into engagement with said stationary contact.

* * * * *